(12) United States Patent  
Quantz

(10) Patent No.: US 6,270,824 B1  
(45) Date of Patent: Aug. 7, 2001

(54) HIGH PRODUCTION NUTCRACKING APPARATUS HAVING IMPROVED ALIGNMENT CAPABILITY

(75) Inventor: James Bland Quantz, Lexington, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 09/723,888

(22) Filed: Nov. 28, 2000

(51) Int. Cl.[7] ............................... A23N 5/00; A23L 1/00
(52) U.S. Cl. ..................... 426/482; 99/568; 99/571; 99/574; 99/581; 426/632
(58) Field of Search ..................... 99/568, 571–576, 99/577–579, 580–583, 600; 426/481, 482, 632, 634; 30/120.1–120.5

(56) References Cited

U.S. PATENT DOCUMENTS

| | | | |
|---|---|---|---|
| 1,160,376 | * 11/1915 | Gilson | 99/569 |
| 1,208,324 | * 12/1916 | Canale | 99/572 |
| 1,342,691 | * 6/1920 | Pape | 99/582 X |
| 1,470,247 | * 10/1923 | Wilms | 99/572 |
| 1,901,798 | * 3/1933 | Boomer | 99/586 X |
| 2,067,566 | * 1/1937 | Field | 99/582 |
| 2,635,662 | * 4/1953 | Doering, et al. | 198/622 X |
| 2,903,134 | * 9/1959 | Ashlock, Jr. | 99/569 X |
| 3,561,513 | * 2/1971 | Lindsey | 99/571 |
| 3,621,898 | * 11/1971 | Turner | 99/571 |
| 3,871,275 | 3/1975 | Quantz . | |
| 4,332,827 | 6/1982 | Quantz . | |
| 4,418,617 | 12/1983 | Quantz . | |
| 4,441,414 | 4/1984 | Quantz . | |
| 5,623,867 | 4/1997 | Quantz . | |

* cited by examiner

Primary Examiner—Timothy F. Simone
(74) Attorney, Agent, or Firm—Alston & Bird LLP

(57) ABSTRACT

A high production nutcracking apparatus wherein the nuts are fed from a hopper on a feed conveyor to a cracking apparatus. The cracking apparatus is in the form of a plurality of cracking units mounted on a rotatable turret, and the rotating cracking units are cyclically controlled so as to clampingly engage and lift each oriented nut from the advancing conveyor, and so as to preserve its orientation. Each nut is then cracked and thereafter released at separate spaced points along the circular path of travel of the cracking unit. A structure and procedure for aligning the cracking units of the turret with respect to the feed conveyor is disclosed.

14 Claims, 4 Drawing Sheets

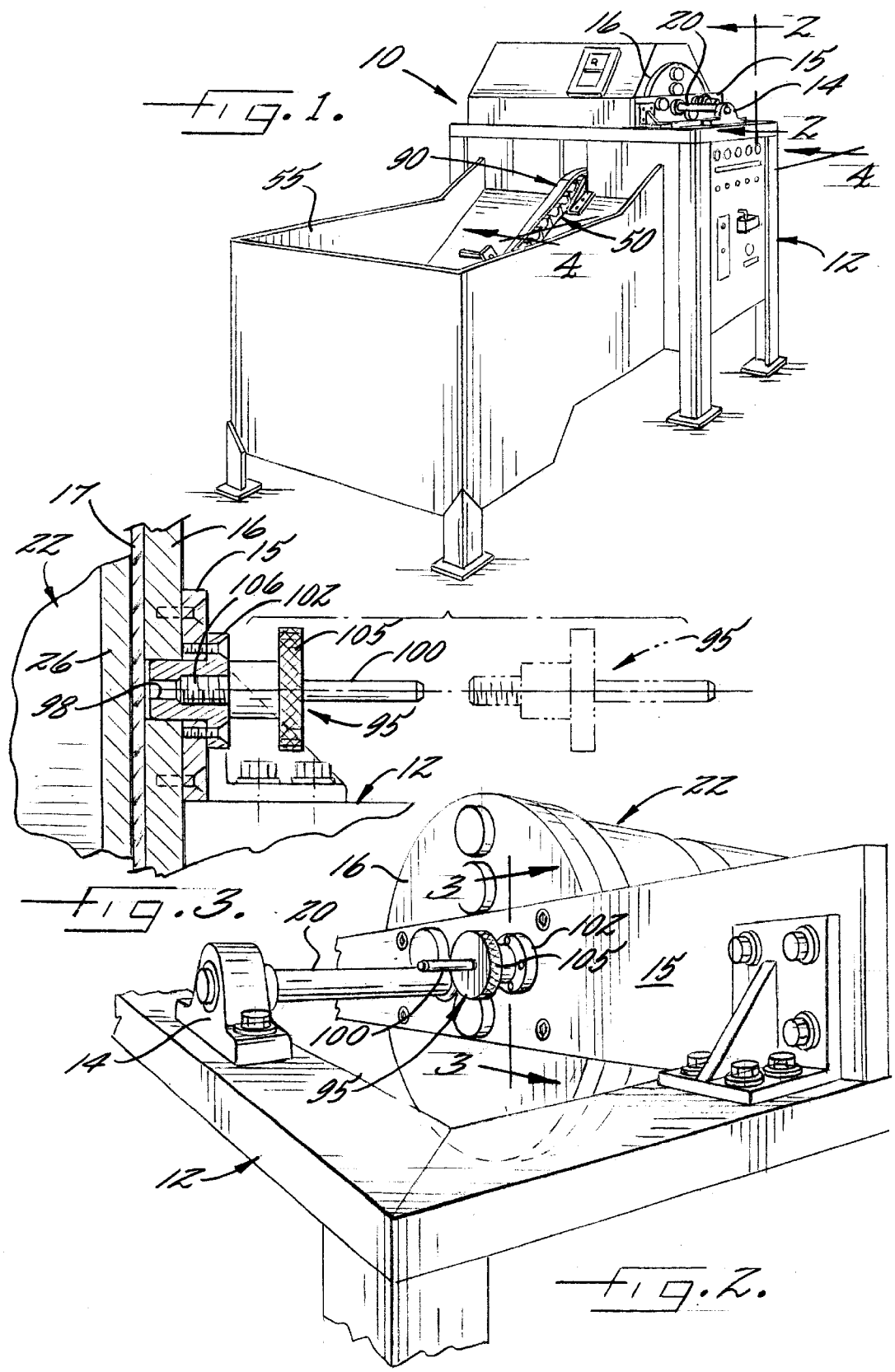

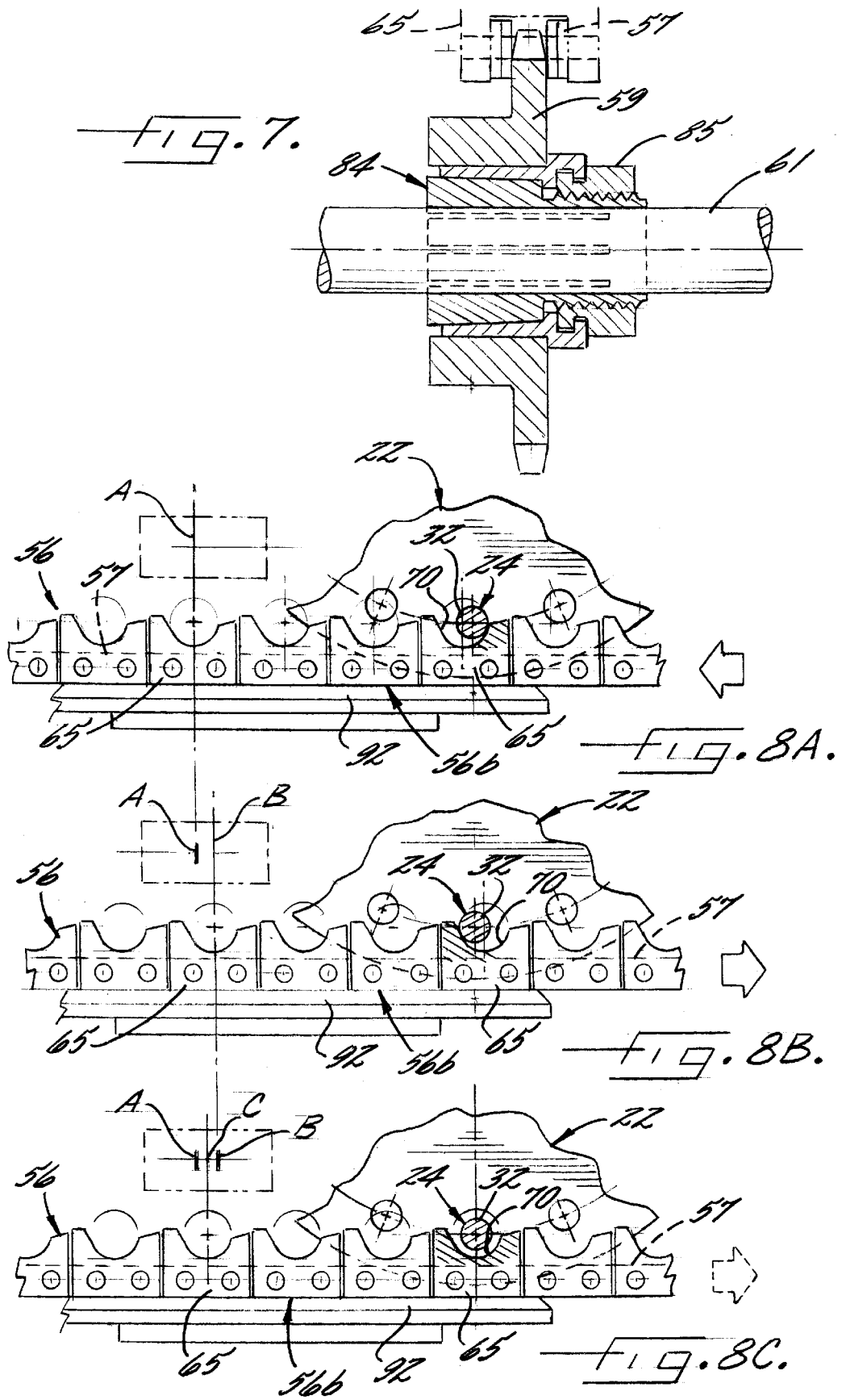

HIGH PRODUCTION NUTCRACKING APPARATUS HAVING IMPROVED ALIGNMENT CAPABILITY

BACKGROUND OF THE INVENTION

The present invention relates to an improved high production nutcracking apparatus, and more particularly, to a nutcracking apparatus of the type disclosed for example in U.S. Pat. No. 5,623,867 and application Ser. No. 09/638,423 filed Aug. 14, 2000, now U.S. Pat. No. 6,205,915 and which has an improved capability of aligning its components.

The nutcracking apparatus as disclosed in the above patent and application includes a rotatable turret which mounts a plurality of cracking units arranged about its periphery, with each cracking unit having an opening adapted to receive an individual nut from a nut feed conveyor which comprises a plurality of nut transport elements mounted in succession on a feed chain. Each of the nut transport elements includes an upwardly open transverse receptacle for holding an individual nut, and each cracking unit on the turret has an anvil which is moved axially into the receptacle at a pickup point so that the nut is engaged between the anvil and a crack die on the other side of the opening.

In operation, the feed conveyor moves tangentially past the rotating turret so that the anvils of the cracking units enter the receptacles of respective nut transport elements at the pickup point and engage and pick up the nut. After the cracking unit and engaged nut have moved away from the pickup point, the crack die of the cracking unit applies an impact to the nut to crack the shell.

To insure proper engagement of the nut, and to avoid damage to the components of the machine, it is important that the cracking units be properly aligned and timed with respect to the receptacles of the nut transport elements. Heretofore, the alignment and timing operation was carried out by manually releasing the drive of the turret so that it could be rotated without causing the feed conveyor to advance, and the turret was then rotated until the operator believed the anvil of a cracking unit was in its bottom dead center position and centered in a receptacle. This procedure was unsatisfactory however, since the covers and other components of the apparatus rendered it very difficult if not impossible to see the anvil of the lowermost cracking unit when it is located in the receptacle. Thus, proper alignment was not assured.

It is accordingly an object of the present invention to provide a high production nutcracking apparatus of the described type and which has provision for a simple and reliable alignment of the cracking units with respect to the receptacles of the nut transport elements.

SUMMARY OF THE INVENTION

The above and other objects and advantage of the present invention are achieved by the provision of a high production nutcracking apparatus which comprises a turret mounted on a machine frame for rotation about a horizontal central axis, with the turret mounting a plurality of cracking units which are uniformly spaced about the periphery of the turret. An endless feed conveyor is provided which is composed of a plurality of nut transport elements mounted in succession along a feed chain, with each element including a generally semi-cylindrical receptacle which extends laterally across the element. The feed conveyor is mounted to the machine frame so as to define an upper run which extends generally tangentially with the periphery of the turret and to define a pickup point where the upper run perpendicularly intersects a radius of the turret. A drive system is provided for concurrently rotating the turret about the central axis and advancing the feed conveyor such that the cracking units are aligned with the receptacles of respective nut transport elements at the pickup point, and the drive system includes a releasable interconnection for permitting relative movement between the turret and feed conveyor at the pickup point. An indicator and locking device is mounted on the turret and the machine frame for indicating when the turret is rotated to a point wherein one of said cracking units is in a bottom dead center position with respect to the pickup point and for locking the turret against rotation in such position.

With the nutcracking apparatus as described above, the cracking units of the turret may be aligned with the receptacles of the nut transport elements by rotating the turret to an aligned position wherein one of the cracking units is in the bottom dead center position, and then moving the feed conveyor while the turret is stationary in the aligning position until the receptacle of one of the nut transport elements is centered in radial alignment with the one cracking unit which is in the bottom dead center position.

More particularly, the alignment procedure includes the steps of disengaging the interconnection of the drive system, rotating the turret to the aligned position wherein one of the cracking units is in a bottom dead center position with respect to the pickup point, then moving the feed conveyor while the turret is held stationary until the receptacle of one of the nut transport elements is centered in radial alignment with the cracking unit which is in the bottom dead center position, and then re-engaging the interconnection of the drive system. The apparatus is then in condition for normal, high speed operation, with a precise alignment of the nut cracking units with the receptacles of the nut transport elements being assured.

BRIEF DESCRIPTION OF THE DRAWINGS

Some of the objects and advantages of the invention having been stated, others will appear as the description proceeds, when taken in connection with the accompanying drawings, in which:

FIG. 1 is a perspective view of a nutcracking apparatus which embodies the features of the present invention;

FIG. 2 is a fragmentary perspective view of the front end of the apparatus taken along the line 2—2 of FIG. 1;

FIG. 3 is a fragmentary sectional view taken along the line 3—3 of FIG. 2 and illustrating the indicator and locking device of the present invention, with the locking pin of the device in its storage position;

FIG. 7 is a cross sectional view of the releasable drive sprocket for the feed conveyor;

FIG. 8A is a fragmentary sectional view illustrating the turret and feed conveyor in a first position of the alignment procedure;

FIG. 8B is similar to FIG. 8A and illustrating a second position of the alignment procedure; and FIG. 8C is similar to FIGS. 8A and 8B and illustrating the final position of the alignment procedure and wherein the lowermost cracking unit is aligned in the receptacle of the associated nut transport element.

DETAILED DESCRIPTION OF THE PREFERRED EMBODIMENTS

Referring more specifically to the drawings, a nutcracking apparatus embodying the features of the present invention is illustrated generally at 10 in FIG. 1. The apparatus includes a rectangular box-like frame 12 which supports a pair of bearing blocks 14 (note FIG. 5) which rotatably mount a central shaft 20 which defines a horizontal central axis.

Figure 5:
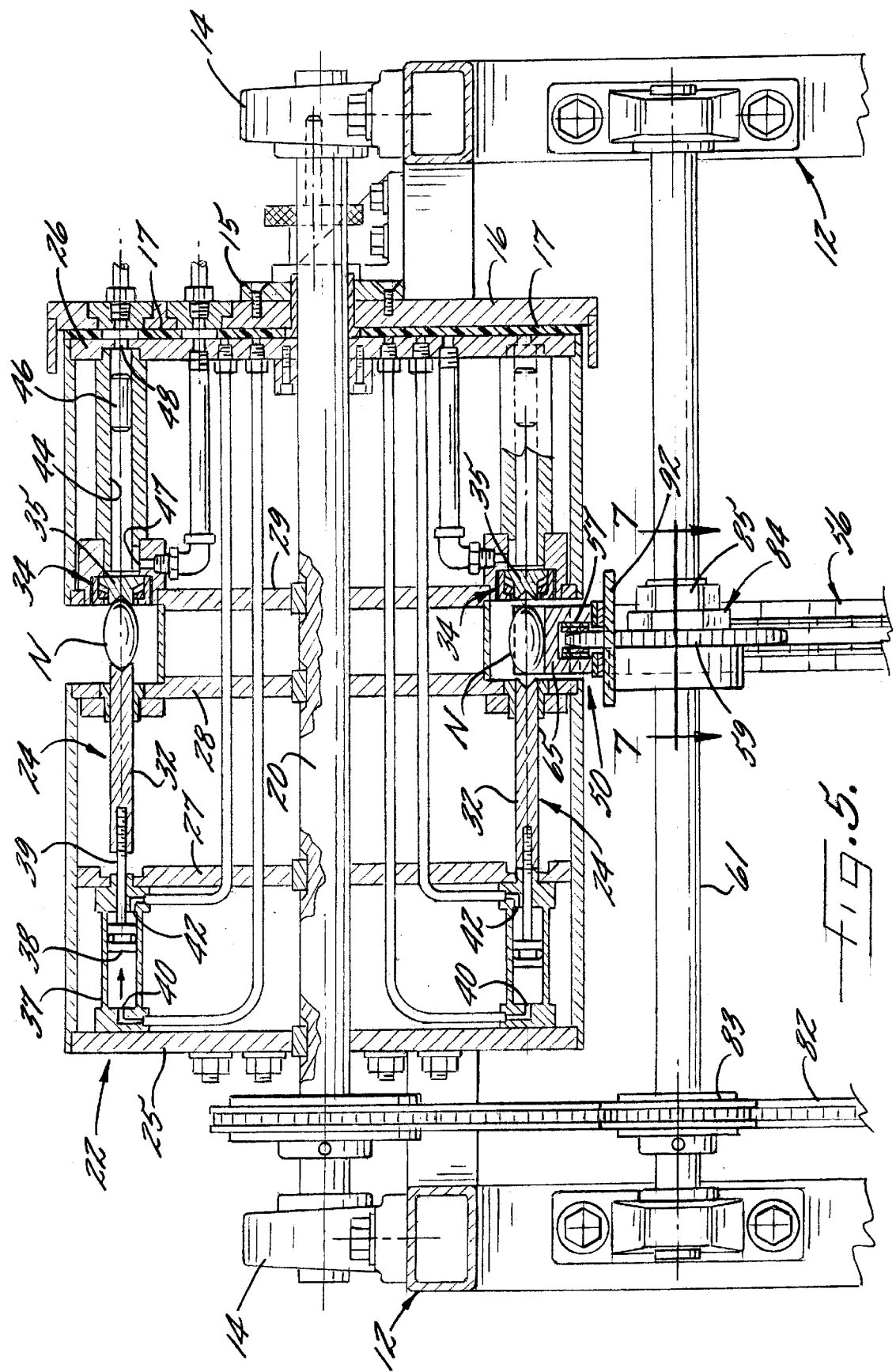
FIG. 5 is a fragmentary sectional view of the turret taken along the line 5—5 of FIG. 4, and illustrating two of the cracking units.

As best seen in FIG. 5, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. The frame 12 includes a front plate 15 and a cover 16 which is mounted to the front plate and overlies the end plate 26. A felt pad 17 is disposed between the end plate 26 and the cover so as to facilitate relative rotation while maintaining air seals in the manner which will become apparent.

There are sixteen cracking units 24 in the illustrated embodiment and the units extend generally parallel to each other and to the central axis. Each of the cracking units 24 comprises an anvil 32, a cracking die assembly 34 which includes a cracking die 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617 and 4,441,414, the disclosures of which are expressly incorporated herein by reference.

The cracking die assembly 34 is more fully described in the above referenced '414 patent, and in copending U.S. patent application Ser. No. 09/592,245, filed Jun. 13, 2000, and it includes the cracking die 35, and a second air cylinder 44. A free floating shuttle 46 is mounted within the cylinder 44. In addition, there is provided an air port 47 adjacent the forward end of the cylinder and a further port 48 which extends axially through the rearward end of the cylinder.

The control system for cyclically actuating the cracking unit includes an air control system whereby air is selectively introduced into the four ports 40, 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking die 35. The anvil 32 and cracking die 35 thereby also serve to compressively stress the retained nut. High pressure air is next injected through the port 48 and into the air cylinder 44, such that the shuttle 46 is thrust forwardly along the cylinder and impacts against the rear end surface of the cracking die 35, causing the cracking die to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The apparatus of the present invention further includes an apparatus 50 for advancing and delivering a plurality of nuts individually in succession along a path of travel to the rotating turret 22. This nut delivering apparatus includes a hopper 55 for storing a relatively large quantity of the nuts to be cracked, and an endless feed conveyor 56 which includes a feed chain 57 (FIG. 5) and a pair of supporting sprockets 58, 59 mounted respectively on the shafts 60, 61, which support the feed chain. The feed chain is also supported by a third sprocket (not shown) which is located below the hopper.

The feed conveyor 56 is mounted for movement about the sprockets 58, 59, and includes an upper run which extends through the lower portion of the hopper 55 and along a path of travel which includes an upwardly inclined segment 56a extending through the lower portion of the hopper, and a substantially horizontal segment 56b extending from the upwardly inclined segment to the sprocket 59. The upper run extends generally tangentially with the periphery of the turret and it defines a nut pickup point where the upper run perpendicularly intersects a vertical radius of the turret.

Figure 4:
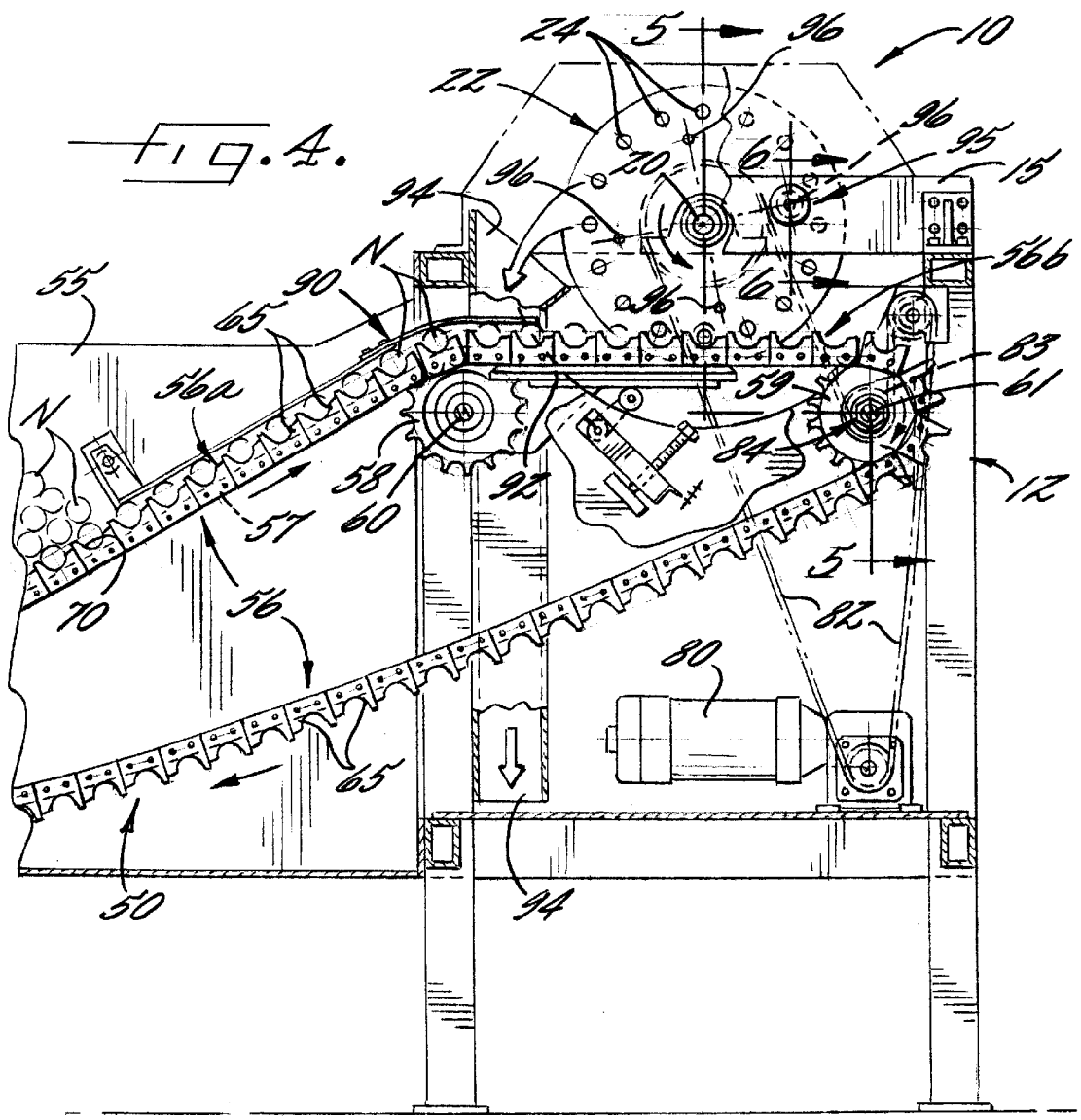
FIG. 4 is a fragmentary sectional side elevation view taken substantially along the line 4—4 of FIG. 1.

A plurality of block-like nut transport elements 65 are mounted in succession along the feed chain 57. As best seen in FIGS. 4 and 5, and as further illustrated in U.S. Pat. No. 5,623,867, each element 65 includes parallel opposite sides, parallel opposite ends, and top and bottom faces (not numbered). A generally semi-cylindrical receptacle 70 extends laterally across the upper face of the element, and so as to communicate with both sides thereof. By design, each receptacle 70 is sized to supportingly receive a single nut to be cracked which is oriented with its end to end direction extending axially along the receptacle. Each element 65 further includes a longitudinal channel in the bottom face for receiving the feed chain 57, and a pair of transverse pins (shown in dashed lines in FIG. 5) for interconnecting the element to the chain.

While in the illustrated embodiment, the segment 56b of the feed conveyor 56 is horizontal, it will be appreciated that the segment 56b could be positioned at an angle with respect to the horizontal so as to tangentially engage the periphery of the turret at a location spaced from its lowermost point. In any event however, the upper run extends tangentially with respect to the periphery of the turret and it defines a nut pickup point where the upper run perpendicularly intersects a radius of the turret.

The conveyor 56 is powered by the motor 80 and drive chain 82, which drives the sprocket 59 and which also drives the turret 22 in the manner seen in FIG. 4, and such that the transport elements and thus the nuts move from the hopper tangentially past the circle defined by the rotating cracking units 24, at a speed corresponding to such rotational speed. More particularly, the drive chain 82 drives a sprocket 83 which is fixed to the drive shaft 61, and a keyless bushing 84 as shown in FIGS. 5 and 7 releasably connects the shaft 61 and the sprocket 59 of the drive chain. The keyless bushing 84 is of conventional design and it incorporates a nut 85 which upon rotation serves to lock and unlock the sprocket 59 to the shaft 61. A keyless bushing of this type is further described in U.S. Pat. No. 5,695,297, the disclosure of which is incorporated by reference.

The hopper 55 includes singularizing and orienting means to ensure that any nuts in excess of one are removed from the receptacle 70 of each nut transport element 65, and that each nut is oriented with its end to end direction extending axially along the receptacle 70. This singularizing and orienting means includes a deflecting plate 90 which is further described in U.S. Pat. No. 5,623,867 and copending application Ser. No. 09/638,423, the disclosures of which are incorporated by reference.

As the nut transport elements advance along the horizontal segment 56b toward and under the pickup point, they are supported by a support plate 92 which is adjustable in elevation with respect to the cracking units in the turret. A further description of the support plate 92 and its mounting structure, may be found in copending application Ser. No. 09/638,423.

To describe the operation of the apparatus in more detail, it will be understood that the motor 80 acts to rotate the turret 22 about the central axis of the shaft 20, and to advance the conveyor 56 so that the upper run moves toward the turret at a speed corresponding to the rotational speed of the cracking units 24. The nut transport elements 65 thereby move in succession through the hopper 55, and the nuts therein are received in the receptacles 70, and singularized and oriented by contact with the plate 90, in the manner described above. The nuts are thereby effectively individually received in the respective receptacles 70, and oriented with their end to end direction being disposed horizontally and perpendicular to the direction of movement of the upper run of the conveyor.

By design, the nuts are moved in succession to the openings between the anvil 32 and cracking die assembly 34 of a cracking unit 24 as the cracking unit passes a nut delivery or pickup point, which is located at about the bottom dead center of the circle defined by the rotating cracking units. By adjustment of the elevation of the support plate 92, the centerline of the nuts being processed can be accurately aligned with the axis along which the anvil and cracking die are moved. At this point, pressurized air is directed to the first port 40 of the cracking unit. The piston 38 and anvil 32 are thereby moved forwardly, and such that the anvil operatively engages one end of the nut N in the opening, and with the force acting through the nut to clampingly engage and retain the nut in an end to end alignment between the anvil 32 and the cracking die 35 of the die assembly 34. The nut is thereby lifted from its receptacle on the feed conveyor 56. The frictional contact between the piston 38 and the walls of the air cylinder 37 serves to maintain the forward axial position of the anvil during rotational movement of the cracking unit upwardly and away from the conveyor.

The nut is then advanced along a curvilinear path of travel, i.e., the circle defined by the rotating cracking units 24, and to a nut stressing location, which is located about 60 degrees beyond the bottom dead center position. At this location, air again enters the first port 40 to compressively stress the retained nut. Immediately thereafter, high pressure air is injected into the port 48 of the air cylinder 44, such that the shuttle 46 is thrust forwardly along the cylinder 44 and impacts against the rear side of the cracking die 35, causing the cracking die to sharply advance a short distance forwardly and thereby crack the nut. The air in front of the advancing shuttle exhausts through the port 47, which is of relatively large diameter to accommodate the entering air without an undue build-up of pressure. Most of the loose shell fragments resulting from the cracking operation are drawn off through a housing by a vacuum line (not shown). Further, the cracking operation preferably occurs while the nut remains under compressive stress.

The cracked nut remains supported between the anvil and cracking die after the cracking operation, and is carried to a release point, which is preferably positioned at about 45 degrees beyond the top dead center position of the turret. At this point, air enters the second port 42, and the piston and anvil are moved rearwardly. The released nut then falls to the laterally directed discharged chute 94 (FIG. 4).

As the final step, air is caused to enter the port 47, and the shuttle 46 to return to its rearward position. The cycle may then be repeated as the cracking units move through the loading position to receive another nut from an aligned receptacle.

As will be apparent, it is important that the cracking units 24 of the turret 22 be precisely aligned with nut transport elements 65 so that the anvil 32 of each cracking unit enters the receptacle of the associated nut transport element at the midpoint of the longitudinal width of the receptacle. If misalignment is present, the anvil may engage the side of the element 65, or it may enter the receptacle but not engage the centerline of the nut, thereby causing the nut to be deflected and not picked up.

To permit the alignment procedure of the present invention to proceed in the manner further described below, the apparatus incorporates an indicator and locking device 95 which is mounted on the turret 22 and the machine frame 12 for indicating when the turret is rotated to a point wherein one of the cracking units is in a bottom dead center position with respect to the pickup point. The turret may then be locked at such point.

The indicator and locking device 95 includes four openings 96 in the end plate 26 of the turret, note FIG. 4, with the openings 96 being equally spaced in the circumferential direction and so that each opening 96 is positioned in a predetermined location with respect to the cracking units. The front plate 15 of the frame includes a bore 98 which extends through the cover 16 and is radially spaced so as to communicate with the openings 96 as the turret rotates. By design, when the bore 98 is aligned with any one of the openings 96 in the end plate 26, one of the cracking units 24 is positioned at the desired bottom dead center position. The number of openings 96 in the end plate 26 is arbitrary, and only one is required for the alignment procedure as described below to be carried out. However, the presence of a plurality of openings 96, any one of which is useable, facilitates the procedure as will become apparent.

Figure 6:
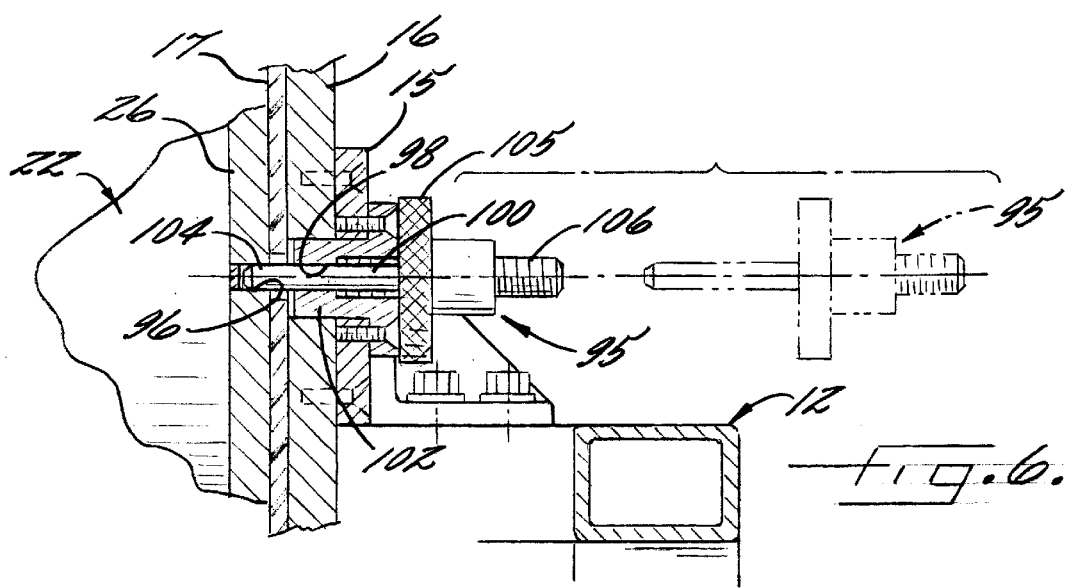
FIG. 6 is a view similar to FIG. 3 and illustrating the locking pin in its operative position.

The indicator and locking device 95 further includes a pin 100 which is removably mounted in the bore 98 in the frame so that the pin may enter any one of the openings 96 in the end plate when one of the cracking units is in the bottom dead center position. The turret is then locked against further rotation, note FIG. 6. The inner end of each opening 96 may be closed to prevent oil and debris from entering into the turret.

The bore 98 in the frame is defined by a bushing 102 which is bolted to the frame, and the outer end position of the bore 98 in the bushing 102 is internally threaded. The pin 100 has one end 104 which is of a size and length to extend through the bore 98 in the bushing 102 and into the opening 96 of the end plate of the turret. The medial portion of the pin 100 mounts a knurled hand grip 105 and the opposite end 106 is externally threaded so as to permit the threaded opposite end of the pin to be threadedly received in the threaded portion of the bore 98 in the bushing to define a storage position wherein the pin does not engage an opening 96 in the end plate. This storage position is illustrated in FIG. 3, and prevents the pin from being inadvertently misplaced and lost.

In accordance with the present invention, the required precise alignment of the apparatus is achieved by the following steps:

1. The locked connection of the keyless bushing 84 is released by rotation of the nut 85 so that the sprocket 59 is free to rotate relative to the shaft 61 and thus the turret.

2. The turret is manually rotated until the bore 98 in the bushing 102 is aligned with the nearest one of the openings 96 in the end plate 26, thereby indicating that one of the cracking units 24 is in a bottom dead center position with respect to the feed conveyor. The anvil 32 of the one cracking unit will be concurrently extended by air entering through the port 40.

3. The pin 100 is inserted through the bore 98 and into the aligned opening 96 to lock the turret in an aligned position.

4. The feed conveyor 56 is moved by hand in a rearward direction until the extended anvil engages the front wall of the receptacle 70, note FIG. 8A, and the position of a reference point (e.g. an end wall of one of the elements 65) on the feed conveyor is recorded by a mark at A on a reference member (e.g. a sheet of paper) which is temporarily mounted to the frame.

5. The feed conveyor 56 is moved in a forward direction until the extended anvil engages the rear wall of the receptacle and the reference point on the feed conveyor is recorded by a mark at B on the reference member.

6. The feed conveyor 56 is moved rearwardly until the reference point is midway between the marks A and B, i.e. at C, which conforms to the desired alignment position.

7. The keyless bushing 84 is tightened by rotation of the nut 85 to lock the sprocket 59 to the shaft 61.

8. The pin 100 is removed and repositioned to its storage position as seen in FIG. 3. The machine is then aligned and ready for normal operation.

In the drawings and specification, there has been set forth a preferred embodiment of the invention, and although specific terms are employed, they are used in a generic and descriptive sense only and not for purposes of limitation.

That which is claimed:

1. A high production nutcracking apparatus comprising
   a turret mounted on a machine frame for rotation about a horizontal central axis, with said turret mounting a plurality of cracking units which are uniformly spaced about the periphery of the turret,
   an endless feed conveyor including a plurality of nut transport elements mounted in succession along a feed chain, with each element including a generally semicylindrical receptacle which extends laterally across the element, said feed conveyor being mounted to the machine frame so as to define an upper run which extends generally tangentially with the periphery of the turret and to define a pickup point where the upper run perpendicularly intersects a radius of the turret,
   a drive system for concurrently rotating the turret about the central axis and advancing the feed conveyor such that the cracking units are aligned with the receptacles of respective nut transport elements at the pickup point, and including a releasable interconnection for permitting relative movement between the turret and feed conveyor at the pickup point,
   an indicator and locking device mounted on the turret and the machine frame for indicating when the turret is rotated to a point wherein one of said cracking units is in a bottom dead center position with respect to the pickup point and for locking the turret against rotation in said position,
   whereby the cracking units of the turret may be aligned with the receptacles of the nut transport elements by rotating the turret to an aligned position wherein one of the cracking units is in the bottom dead center position, and then moving the feed conveyor while the turret is stationary in said aligned position and until the receptacle of one of the nut transport elements is centered in radial alignment with the one cracking unit which is in the bottom dead center position.

2. The apparatus as defined in claim 1 wherein said turret includes an end plate which is mounted so as to lie in a plane which is perpendicular to said central axis, and wherein said indicator and locking device includes an opening in said end plate and a pin removably mounted to said machine frame so that the pin may enter the opening in said end plate when the turret is in said aligned position and thereby prevent the rotation of the turret from said position.

3. The apparatus as defined in claim 2 wherein said pin is removably mounted to said machine frame by means of a bore in said machine frame which is radially aligned with the opening in said end plate and so that the pin may pass through the bore and enter the opening when the turret is in the aligned position.

4. The apparatus as defined in claim 3 wherein the bore in the machine frame is internally threaded at least at the end thereof opposite the end plate, and wherein the pin has one end which is of a size and length to extend through the bore in the machine frame and into the opening of the end plate, and an opposite end which is externally threaded so as to permit the threaded opposite end of the pin to be threadedly received in the threaded bore in the machine frame to define a storage position wherein the pin does not engage the opening in the end plate.

5. The apparatus as defined in claim 1 wherein each of said cracking units comprises means for clampingly engaging and removing a nut in the receptacle of a nut transport element as the element moves through the pickup point, and means for imparting a cracking force to the engaged nut after the cracking unit moves away from the pickup point.

6. The apparatus as defined in claim 5 wherein the means for clampingly engaging and removing a nut comprises an anvil, a cracking die, and means mounting said anvil and cracking die in an axially aligned, opposed relationship to define a nut receiving opening therebetween, and with each of said anvil and cracking die being axially movable toward and away from each other, and
   control means for moving said anvil axially toward said cracking die to operatively engage and support a nut disposed in said nut receiving opening and to move the cracking die to an axially withdrawn position upon the cracking unit passing said pickup point, and for maintaining the forward axial position of said anvil during movement of the cracking unit to a second circumferential location.

7. The apparatus according to claim 6 wherein the means for imparting a cracking force to the engaged nut comprises further control means for sharply advancing the cracking die axially toward said anvil upon the cracking unit reaching the second circumferential location to effectively crack a nut supported between the cracking die and anvil.

8. The apparatus as defined in claim 7 wherein said further control means further includes means for applying a biasing force to said anvil upon the cracking unit reaching a point immediately upstream of said second circumferential location, and such that the biasing force applies a compressive stress to the nut during the application of the cracking force.

9. A method of aligning a high production nutcracking apparatus of the type comprising a turret mounted on a machine frame for rotation about a horizontal central axis, with said turret mounting a plurality of cracking units which are uniformly spaced about the periphery of the turret, an endless feed conveyor including a plurality of nut transport elements mounted in succession along a feed chain, with each element including a generally semi-cylindrical receptacle which extends laterally across the element, said feed conveyor being mounted to the machine frame so as to define an upper run which extends generally tangentially with the periphery of the turret and to define a pick up point where the upper run perpendicularly intersects a radius of the turret, and a drive system for concurrently rotating the turret about the central axis and advancing the feed conveyor such that the cracking units are in alignment with the receptacles of respective nut transport element at the pickup point, the method comprising the steps of rotating the turret so that one of the cracking units is in a bottom dead center position with respect to the pickup point, and then moving the feed conveyor while the turret is stationary until the receptacle of one of the nut transport elements is centered in radial alignment with the one cracking unit which is in the bottom dead center position.

10. The method of claim 9 wherein each of the cracking units includes an axially moveable anvil which is moveable into a receptacle of a nut transport element which is located at the pickup point, and wherein the method comprises the further step of moving the anvil of the one cracking unit into the receptacle of the one nut transport element after the step of rotating the turret and before the step of moving the feed conveyor.

11. The method of claim 10 wherein the step of moving the feed conveyor comprises the steps of advancing the feed conveyor until the advance is stopped by one side of the receptacle engaging the anvil which has been moved into the receptacle and then recording the location of the feed conveyor, and then withdrawing the feed conveyor until the withdrawal is stopped by the other side of the receptacle engaging the anvil and recording the location of the feed conveyor, then moving the feed conveyor to a location centered between the two recorded locations.

12. The method of claim 11 wherein the drive system includes a releasable interconnection for permitting relative movement between the turret and feed conveyor at the pickup point, and wherein the method comprises the further step of releasing the interconnection prior to the step of moving the feed conveyor, and engaging the interconnection after the step of moving the feed conveyor so as to fix the rotation of the turret with respect to the movement of the feed conveyor.

13. The method of claim 12 wherein the step of releasing the interconnection occurs prior to the step of rotating the turret.

14. The method of claim 12 wherein the step of rotating the turret includes locking the turret against rotation when the one cracking unit is in the bottom dead center position.

* * * * *